United States Patent
Saha et al.

(10) Patent No.: US 11,444,347 B2
(45) Date of Patent: Sep. 13, 2022

(54) THREE-DIMENSIONAL RECHARGEABLE BATTERY WITH SOLID-STATE ELECTROLYTE

(71) Applicant: LAWRENCE LIVERMORE NATIONAL SECURITY, LLC, Livermore, CA (US)

(72) Inventors: Sourabh K. Saha, Livermore, CA (US); Robert M. Panas, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 372 days.

(21) Appl. No.: 16/651,777

(22) PCT Filed: Feb. 28, 2018

(86) PCT No.: PCT/US2018/020298
§ 371 (c)(1),
(2) Date: Mar. 27, 2020

(87) PCT Pub. No.: WO2019/074538
PCT Pub. Date: Apr. 18, 2019

(65) Prior Publication Data
US 2020/0259233 A1 Aug. 13, 2020

Related U.S. Application Data

(60) Provisional application No. 62/569,694, filed on Oct. 9, 2017.

(51) Int. Cl.
*H01M 12/08* (2006.01)
*H01M 10/052* (2010.01)
(Continued)

(52) U.S. Cl.
CPC .......... *H01M 12/08* (2013.01); *H01M 10/052* (2013.01); *H01M 10/0565* (2013.01); *H01M 10/0569* (2013.01)

(58) Field of Classification Search
CPC ................ B33Y 80/00; H01M 10/052; H01M 10/0565; H01M 10/0569; H01M 12/08;
(Continued)

(56) References Cited

U.S. PATENT DOCUMENTS 9,099,758 B2 8/2015 Kumar et al.
9,178,255 B2 11/2015 Kumar et al.
(Continued)

FOREIGN PATENT DOCUMENTS

CN 105742761 A 7/2016
CN 105869902 A 8/2016
(Continued)

OTHER PUBLICATIONS

Machine Translation CN 105742761(A) (Year: 2016).*
(Continued)

*Primary Examiner* — Victoria H Lynch
(74) *Attorney, Agent, or Firm* — Eddie E. Scott

(57) ABSTRACT

A scaffold of an electrolyte is fabricated in polymer material using 3D printing techniques. A thin layer of solid electrolyte is deposited on the scaffold followed by burning off the polymer. This leaves behind a 3D foam-like solid electrolyte with two distinct non-overlapping volumes. Lithium followed by a conductive layer (for anode) is then deposited through one volume on the first surface whereas a porous or non-porous conductive layer is deposited on the opposite surface through the second volume. The non-porous conductive layer on the second surface is made porous by a selective timed etch.

24 Claims, 13 Drawing Sheets

(51) Int. Cl.
*H01M 10/0565* (2010.01)
*H01M 10/0569* (2010.01)

(58) Field of Classification Search
CPC ............... H01M 2004/027; H01M 2004/8689; H01M 2300/0071; H01M 4/134; H01M 4/382; H01M 4/86; H01M 4/88; Y02E 60/10; Y02P 70/50
See application file for complete search history.

(56) References Cited

U.S. PATENT DOCUMENTS

| 2012/0216394 A1 | 8/2012 | Kitaura et al. |
| 2015/0104720 A1 | 4/2015 | Ma et al. |

FOREIGN PATENT DOCUMENTS

| JP | 2011263789 A | 12/2011 |
| JP | 2013239297 A | 11/2013 |
| KR | 10-2016-0007186 A | 1/2016 |

OTHER PUBLICATIONS

Balaish et al., "A critical review on lithium-air battery electrolytes," Phys. Chem. Chem. Phys., 2014, 16, pp. 2801-2822.

"Article BU-212: Future Batteries," Experimental Rechargeable Batteries—Battery University, https://batteryuniversity.com/index.php/learn/article/experimental_rechargeable_batteries, 9 pp.

Geng, et al., "From Lithium-Oxygen to Lithium-Air Batteries: Challenges and Opportunities," Adv. Energy Mater., 6(9), 1502164, 2016, 14 pp.

Girishkumar et al., "Lithium-air battery: promise and challenges," J. of Phys. Chem. Lett., 1(14), 2010, pp. 2193-2203.

International Search Report and Written Opinion for PCT/US2018/020298 corresponding to U.S. Appl. No. 16/651,777, 10 pages.

Kitaura et al., "Electrochemical performance and reaction mechanism of all solidstate lithium air batteries composed of lithium, Li 1+ x Al y Ge 2− y (PO 4) 3 solid electrolyte and carbon nanotube air electrode," Energy Environ. Sci., 5(10), 2012, pp. 9077-9084.

Kumar et al., "A Solid-State, Rechargeable, Long Cycle Life Lithium-Air Battery," Journal of The Electrochemical Society, 157 (1), 2010, pp. A50-A54.

Li et al., "The pursuit of rechargeable solid-state Li-air batteries," Energy Environ. Sci., 6(8), 2013, pp. 2302-2311.

Liang et al., "Composite lithium metal anode by melt infusion of lithium into a 3D conducting scaffold with lithiophilic coating", PNAS, vol. 113, No. 11, 2016, pp. 2862-2867.

Lim et al., "Superior rechargeability and efficiency of lithium-oxygen batteries: hierarchical air electrode architecture combined with a soluble catalyst," Angew. Chem. Int. Ed., 53(15), 2014, pp. 3926-3931.

Rahman et al., "A review of high energy density lithium-air battery technology," J. Appl. Electrochem., 44(1), 2014, pp. 5-22.

\* cited by examiner (301)

(302)

(303)

(304)

(305)

(306)

(307)

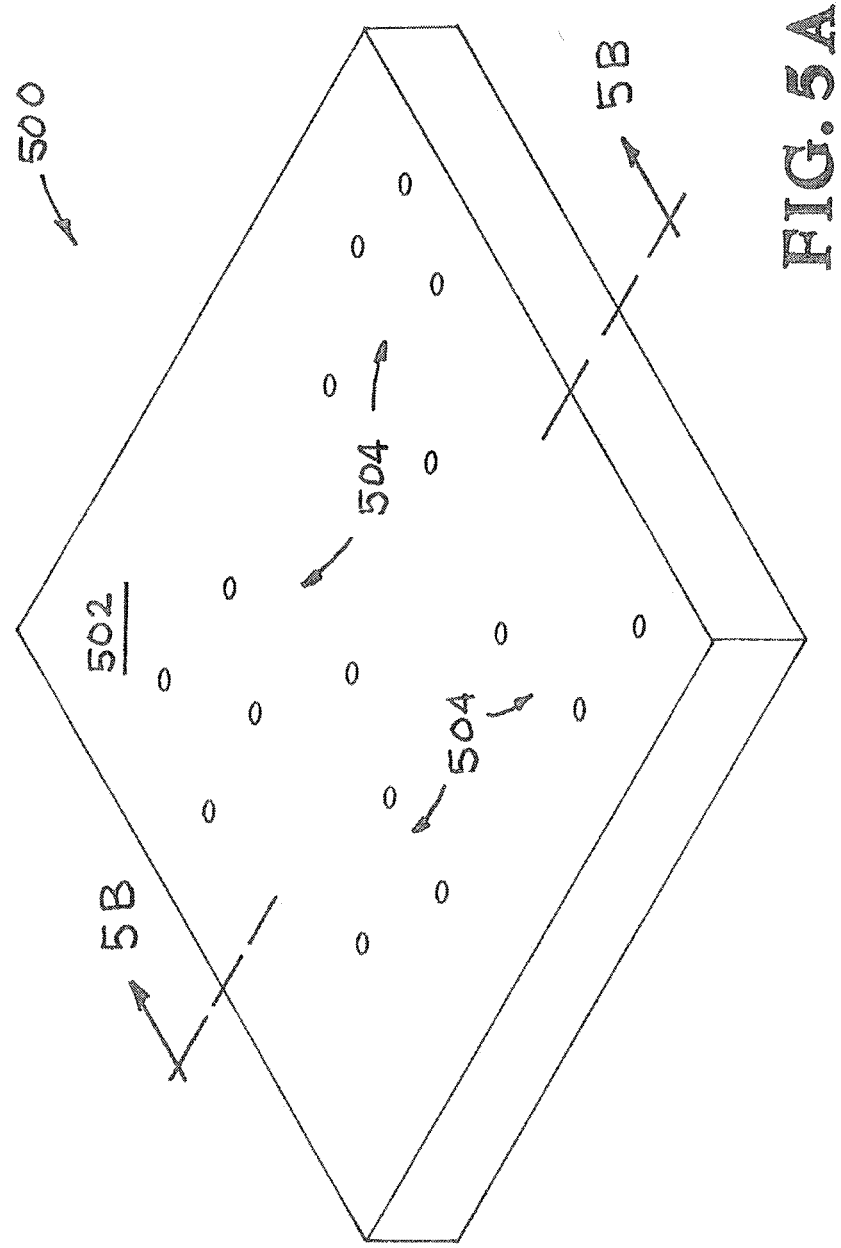

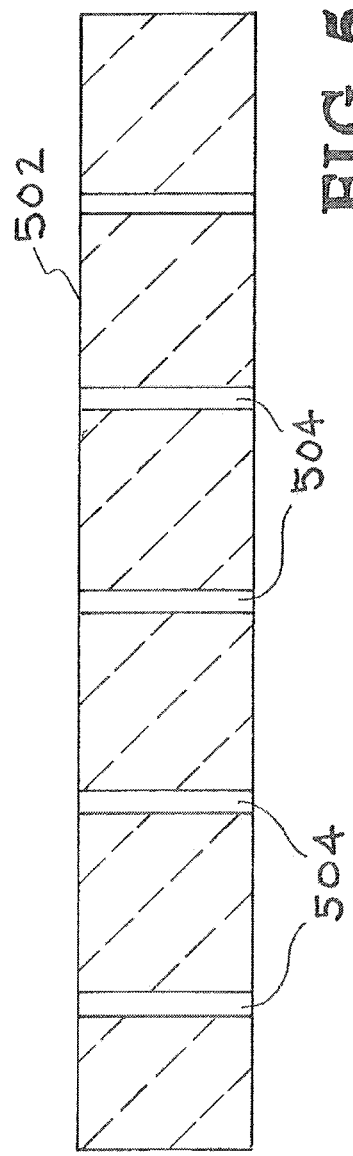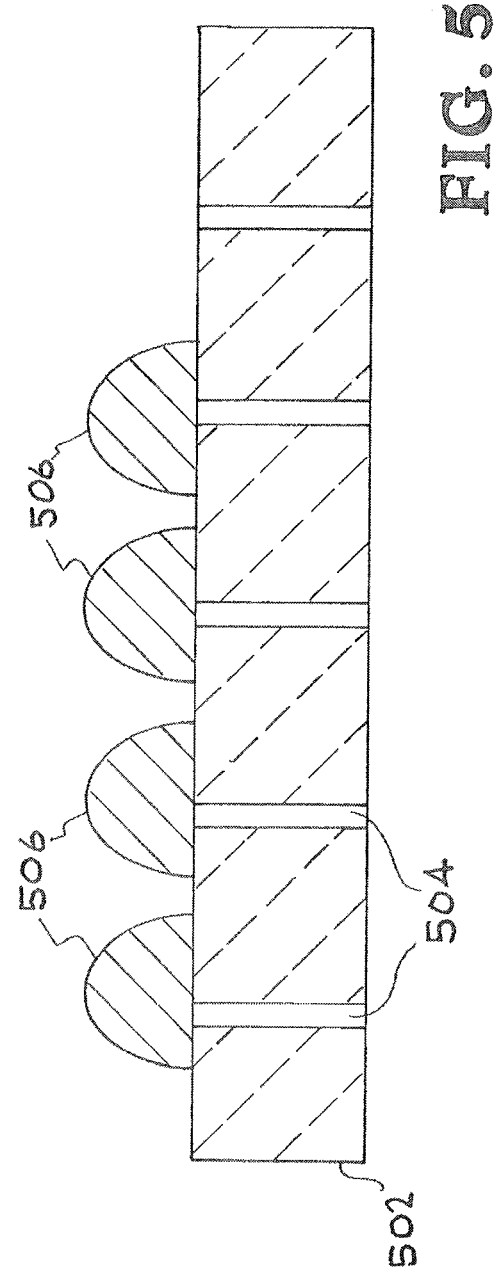

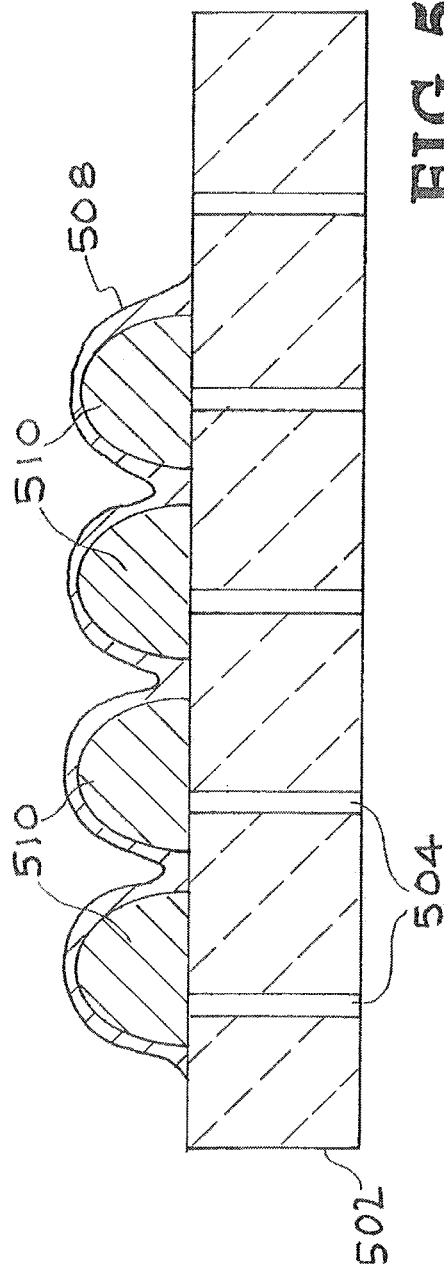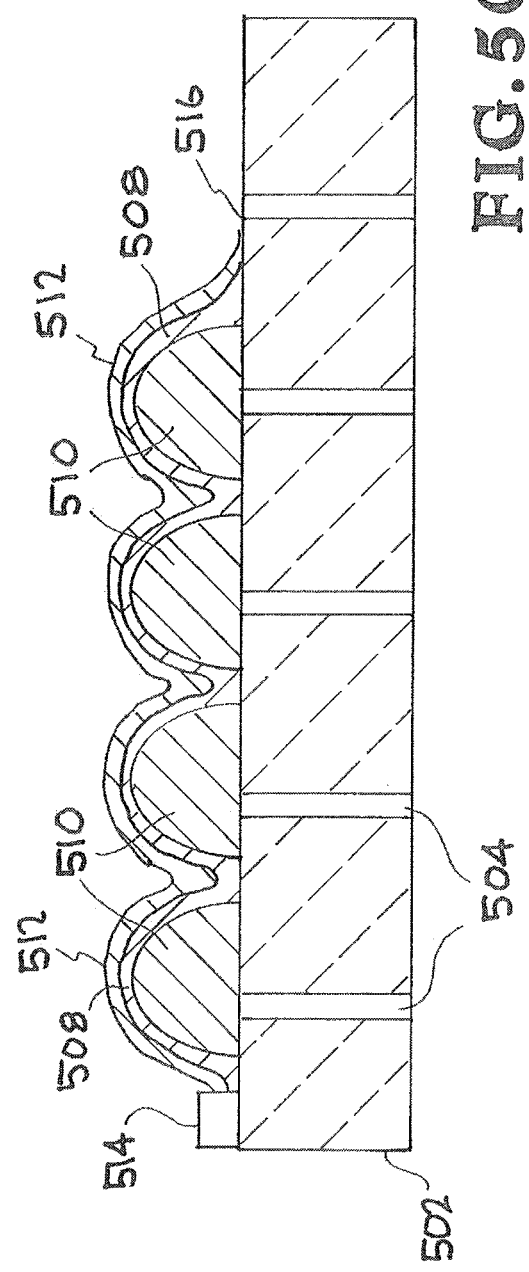

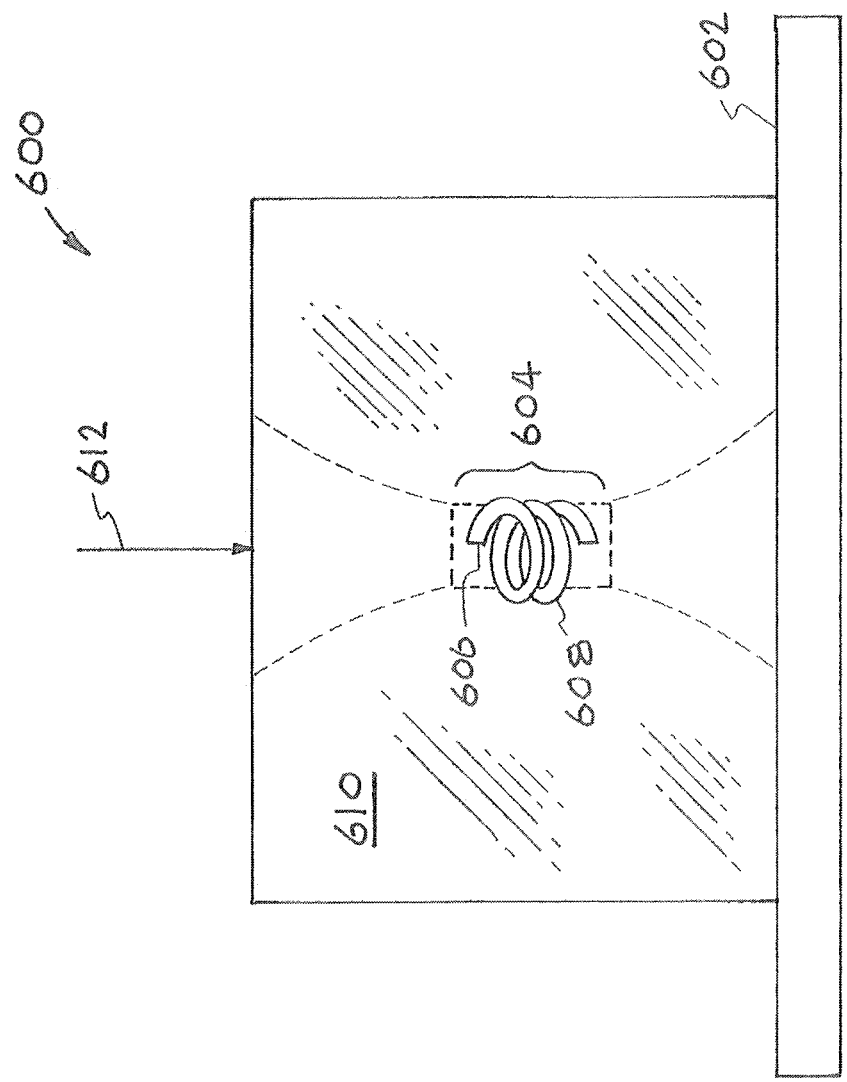

THREE-DIMENSIONAL RECHARGEABLE BATTERY WITH SOLID-STATE ELECTROLYTE

CROSS-REFERENCE TO RELATED APPLICATIONS

This application claims priority to and benefit under 35 U.S.C. § 119(e) of United States Provisional Patent Application No. 62/569,694 filed Oct. 9, 2017 entitled "Three-Dimensional Rechargeable Battery With Solid-State Electrolyte," the content of which is hereby incorporated by reference in its entirety for all purposes.

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to batteries and more particularly to a three-dimensional rechargeable battery with solid-state electrolyte.

State of Technology

This section provides background information related to the present disclosure which is not necessarily prior art.

United States Published Patent Application No. 2016/0344081 for a lithium air battery and method of manufacturing the same includes the state of technology information in the paragraphs reproduced below.

"Lithium air batteries include a negative electrode, a positive electrode for oxidizing/reducing oxygen in the air, and an electrolyte interposed between the positive electrode and the negative electrode. Such lithium air batteries have received a great deal of attention as next generation batteries by using air in the atmosphere as a positive electrode active material, thereby maintaining a very high energy density. [0005]"

"In the discharging process of lithium air batteries, metal ions emitted from the negative electrode react with air (oxygen) of the positive electrode side to produce metal oxides. Further, in the charging process of lithium air batteries, the produced metal oxides are reduced into metal ions and air. [0006]"

United States Published Patent Application No. 2017/0104198 for Ion conductive inks and solutions for additive manufacturing of lithium microbatteries includes the state of technology information in the paragraphs reproduced below. "A separator made of ion conductive ink is produced by additive manufacturing. A micro-battery is produced with the separator made of ion conductive ink located between the battery's anode and cathode. The separator functions to keep the anode and cathode apart and to facilitate the transport of ions to produce an operative micro-battery."

United States Published Patent Application No. 2017/0149106 for a lithium-air battery includes the state of technology information in the paragraphs reproduced below.
"Lithium-oxygen (Li—$O_2$), also known as lithium-air batteries, are considered to be a technology having a future potential. Theoretically, this technology provides specific energies and energy densities similar to those provided by Petrol. It therefore appears to be possible to power electric vehicles up to a range of 550 km and more by this means. [0003]"

"The fundamental functional principle of all lithium-air batteries, despite considerable individual differences in their structure, is based on the following: during discharge, positively charged lithium ions are released from a lithium metal or a lithium alloy at the negative electrode with the release of electrons and then passes through the electrolyte to the positive electrode where the lithium ions react with oxygen ($O_2$) first to form lithium superoxide (LiO.sub.2), and then forming lithium peroxide ($Li_2O_2$). During charging of the battery, this process is reversed. Oxygen ($O_2$) is released at the positive electrode while metallic lithium is deposited or a lithium alloy is formed at the negative electrode. [0004]"

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

So far, the goal of developing a rechargeable battery with an energy density comparable to gasoline has not been achieved. Lithium-air batteries are the only technically feasible batteries that have a theoretical energy density comparable to gasoline. Two different approaches have been investigated by others to overcome the practical challenges of low cycle life and low power density encountered in these batteries. First, to overcome the low cycle-life of these batteries, others have implemented solid state electrolytes with novel catalytic additives. These electrolytes and catalysts: (i) reduce anode failure by preventing dendrite growth and (ii) improve stability and efficiency by reducing the overcharging potential. However, the limitation of low power density and thus high material cost still persists in these designs. In fact, use of a solid electrolyte reduces the power density of the batteries due to the high interface resistance between the electrodes and the electrolyte. Thus, high cycle life with solid-state electrodes is achieved at the expense of power density. The second approach involves using a liquid electrolyte with catalytic additives that have a low interface resistance to increase power density. However, these implementations have low cycle life (sometimes as low as 1 charge-discharge cycle) due to poor electrochemical stability of these liquids. In addition, the liquid electrolyte is steadily lost due to continuous exposure to the gaseous reactant (air or oxygen) at the cathode. Thus, high power density is achieved at the expense of cycle life. Existing lithium air batteries are limited in either their power density or their cycle life.

The Applicants' invention overcomes the combined challenges of low power density and low cycle life in lithium-air batteries by using solid state electrolytes to achieve stability (for high cycle life) and three-dimensional micro and nano scale structuring of the electrolyte to achieve low interfacial resistance (for high power density).

The low power density in existing solid-state lithium-air batteries is caused by the large thickness of the electrolytes (on the order of at least several hundreds of micrometers). In addition, the rate-limiting cathodic reactions can only occur at the three-phase interface of the electrolyte, electron conductor (cathode electrode) and oxygen gas; therefore, the power density of the battery is limited by the surface area of this three-phase interface. In existing solid-state batteries, the ratio of this interface area to volume of the electrolyte is low due to the planar structure of the electrolyte. In Applicants' design, the volume of the solid electrolyte is spread out in 3-dimensional space in the form of a deterministic foam structure wherein the pore sizes are between 0.1 and 10 micrometers. This geometric structuring on the micro/nano scale (i) increases the ratio of interface area to volume by a factor of at least 50 times and (ii) reduces the travel distance of the Li+ ions in the electrolyte by a factor of at least 10 times. In combination, these two factors will significantly increase the power density of the battery. Here, Applicants disclose (i) geometry of the 3D solid-state electrolyte and (ii) process steps to fabricate a functional battery based on this 3D solid-state electrolyte.

Applicants have developed a rechargeable lithium-air battery that utilizes deterministic control of geometry on the nanoscale to achieve the highest possible electrochemical use of lithium while retaining features to ensure it is safe (non-ignitable), has high efficiency (approximately 80% or greater) and is capable of operating over many (multiple 1000's) cycles. One embodiment of the battery includes patterning of both the cathode and anode onto a deterministic solid-state foam electrolyte structure in order to achieve extremely high surface area to volume ratios. This increases lifetime, efficiency and power density. Consumer electronics, vehicles and grid power storage all require low cost, long life, and high energy density storage of electricity.

Applicants' 3D battery disclosed here has the potential to revolutionize energy storage by achieving a 20 times reduction in materials use and thus cost over the present commercial state of the art (4100/kWh). Thus, with material uses on the scale of (45/kWh), and high energy densities of around 500 Wh/kg the inventors' design will enable widespread use of high performance low cost energy storage that no other electrochemistry can match. The inventors' 3D battery has use in Energy storage for (1) Consumer electronics: Computers and Cell phones (2) Vehicles: electric cars, (3) grid electricity storage, and (4) other uses.

The goal was to develop a rechargeable battery that has (i) energy density comparable to gasoline and (ii) power density and charge-discharge lifecycle comparable to commercially available lithium-ion batteries. A battery with these performance metrics would be commercially viable for grid-scale electricity storage and transportation applications. As the energy density of lithium-ion batteries is fundamentally limited by their electrochemistry, one must implement other electrochemistries to achieve this goal. Lithium-air batteries are viable alternatives to lithium-ion batteries as they have a theoretical energy density comparable to gasoline. However, practical implementations of these batteries have encountered challenges in achieving high power density and high charge-discharge lifecycle. A major limitation of this technology has been the inability to engineer suitable electrolytes that have a high ionic conductivity needed for useful power densities and high chemical stability needed for long cycle life. The goal of this invention is to provide the design of a solid-state electrolyte structure that is inherently stable (due to its solid state) and maximizes ionic conductivity per unit active volume of the reactants in the battery (via nano structuring).

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

FIGS. 5A-5G illustrate a miniaturized 2D embodiment of the inventors' battery.

FIG. 6 illustrates a method for fabricating the inventor's battery.

DETAILED DESCRIPTION OF SPECIFIC EMBODIMENTS

Figure 1A:
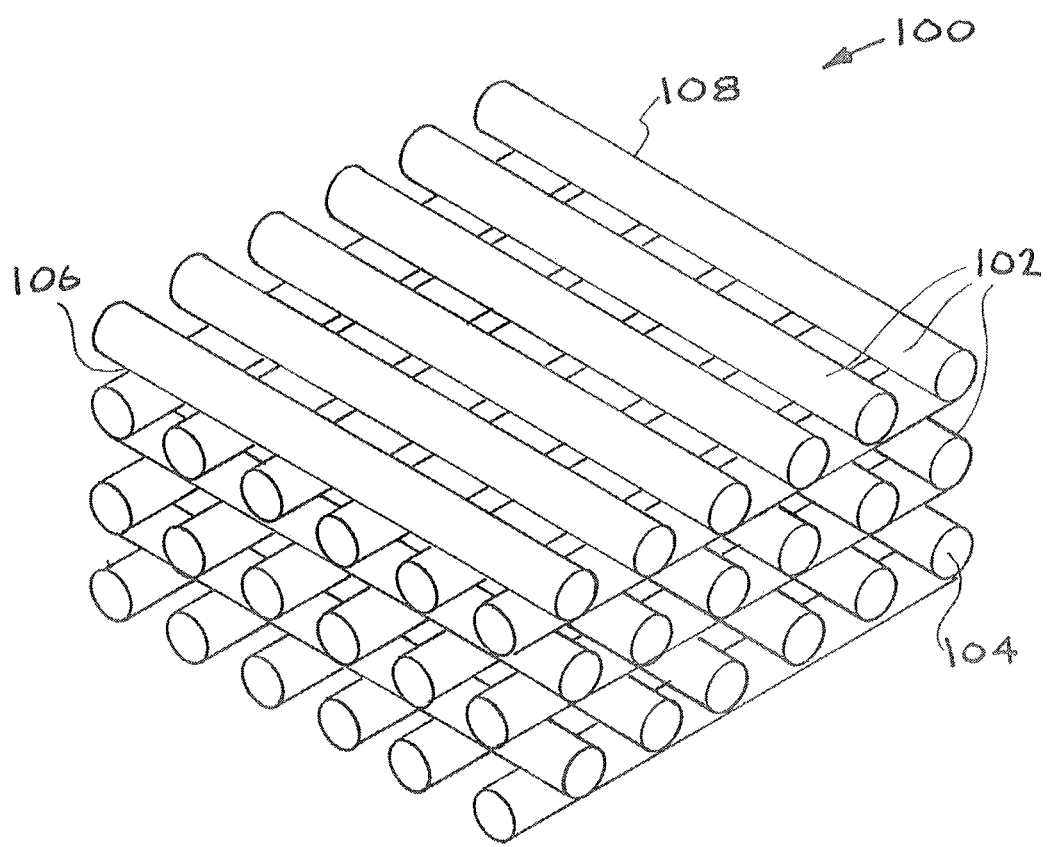
FIGS. 1A, 1B, 1C, and 1D are schematics of the inventors' solid-state lithium-air battery.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Several researchers have investigated the feasibility of lithium-air batteries in the past. For example, researchers have demonstrated that (1) stochastic foam cathodes with liquid electrolytes increase the active surface area and that (2) solid-state electrolytes increase stability. The drawbacks of these two approaches are briefly summarized below.

Approach (1) Foam Like Cathodes with Liquid Electrolytes

A porous material, such as carbon, is generally used as the cathode because cathodic reactions can only occur at the three-phase interface between the Li+ ions in the electrolyte, electrons on the cathode, and the gaseous oxygen. This requirement for a porous structure is generally a confounding factor for stochastic foam cathode structures because the random nature of the cathode causes a breakdown of the three-phase interface into a binary set of two-phase interfaces of electrode-electrolyte interface and electrode-gas interface. In other words, the foam will generally either dry out or get flooded by the liquid electrolyte. Thus, random pores quickly block up in unstructured electrodes. Once this happens, the reaction significantly slows down because only those oxygen molecules that are dissolved into the electrolyte can contribute to the cathodic reaction. As electrolytes are designed to be oxygen impermeable (to minimize side reactions at the anode), pore blocking leads to severe loss of discharge life. In addition to this loss mechanism, these batteries also exhibit all of the other limitations of liquid electrolyte. These limitations are:

Electrolyte decomposition under high recharge overpotential

Reaction with the lithium metal anode to form an irreducible passivation layer

Evaporation of the electrolyte due to constant exposure to gas

High flammability

Despite the limitations of past demonstrations, the inventors have identified from these studies that the microstructure of the cathode significantly affects battery capacity in both non-pore-blocking and pore-blocking regimes. A hierarchical electrode with high surface area and aligned pores to facilitate transport of both reaction ions and catalyst can help bypass many of these issues. The pore size plays a significant role in determining the efficiency, with optimal sizes around 400 nm for high efficiency and high energy storage. As it is impossible to achieve these uniform pore geometries in stochastic foams, these optimal conditions cannot be achieved in existing battery designs. Fortunately, the inventors are capable of implementing these optimal conditions in the inventors' battery design due to the inventors' submicron 3D printing capabilities. As discussed later, the inventors' battery design incorporates these optimal pore geometries in the form of deterministic foams.

Approach (2) Solid-State Electrolytes

Solid-state batteries use a solid ionically conducting yet electrically insulating material to separate the anode and the cathode. The solid electrolyte provides several advantages including inflammability, high dendrite resistance and impermeability to gas diffusion to the anode. The solid material typically has a low ionic conductivity and it is difficult to make conformal contact with the anode and the cathode. Both of these issues increase the recharge overpotential and reduce the charge-discharge efficiency. A rechargeable solid-state lithium-air battery was recently demonstrated by Kumar et al. in 2010 which has received two U.S. patents; U.S. Pat. Nos. 9,099,758 and 9,178,255. Their design utilized doped glass ceramic as a solid electrolyte. Their design offers a valuable balance of safety, stability and performance; however, their batteries were not able to achieve high power densities, and the dopants in the glass were able to react with the lithium leading to irreversible loss of lithium. More recent work has focused on reducing the interfacial resistance by sintering the solid electrolyte onto the cathode directly; however, a significant increase in performance has not been achieved. As such, past demonstrations of solid-state electrolytes suffer from these limitations:

Low power density

High interface resistance at anode-electrolyte and cathode-electrolyte interfaces High overpotential and low charge-discharge efficiency Despite the limitations of past demonstrations, the inventors have identified from these studies that glass ceramics can be used as solid-state electrolytes. The inventors have also identified that the limitations of these electrolytes arise from the inability to generate extremely thin conformal layers of the electrolyte (<10 μm thick) between the two electrodes. Therefore, to overcome the limitations of solid-state electrolytes, the inventors have focused on generating thin conformal layers of the solid electrolyte.

The low power density in existing solid-state lithium-air batteries is caused by the large thickness of the electrolytes (on the order of several hundreds of micrometers). In addition, the rate-limiting cathodic reactions can only occur at the three-phase interface of the electrolyte, electron conductor (cathode electrode) and oxygen gas; therefore, the power density of the battery is limited by the surface area of this three-phase interface. In existing solid-state batteries, the ratio of this interface area to volume of the electrolyte is low due to the planar structure of the electrolyte.

A solid-state battery is one in which all of the components, including the electrodes and the electrolyte, are in the solid phase. Solid-state batteries have several advantages over the more commonly available batteries that contain liquid electrolytes. These advantages are: (i) chemical and thermal stability, (ii) safety against catastrophic failure modes such as explosions due to thermal runaway or short-circuiting, (iii) high shelf life, and (iv) ability to miniaturize and structure the battery into desired geometric shapes. Despite these advantages, solid state batteries have not been commercially successful beyond niche applications because of their limited power density that is caused by the high ionic resistance at the electrolyte-electrode interface. Here, the Applicants present a 3D solid-state electrolyte that overcomes this limitation via micro and nano scale geometric structuring.

To demonstrate the utility of the inventors' structured electrolyte for solid-state batteries, they have selected the lithium-air battery electrochemistry due to its highest energy density amongst all other existing rechargeable batteries. Lithium-air batteries have the potential to reach an energy density of approximately 12,000 Wh/kg. This energy density is approximately the same as that of liquid gasoline. Although the inventors' solid-state electrolyte may be implemented for other reacting-metal batteries without undue experimentation, they have focused exclusively on the reacting-lithium type due to lithium's higher energy density relative to other reacting metals.

In the inventors' apparatus, systems, and methods the volume of the solid electrolyte is spread out in 3-dimensional space in the form of a deterministic foam structure wherein the pore sizes are between 0.1 and 10 micrometers. This geometric structuring on the micro/nano scale (i) increases the ratio of interface area to volume by a factor of at least 50 times and (ii) reduces the travel distance of the Li+ ions in the electrolyte by a factor of at least 10 times. In combination, these two factors will significantly increase the power density of the battery.

Referring now to the drawings, and in particular to 1A, 1B, 1C, and 1D, these schematics illustrate one embodiment of the inventors' solid-state lithium-air battery. This embodiment of embodiment of the inventors' solid-state lithium-air battery is designated generally by the reference numeral 100. The solid-state lithium-air battery 100 includes the components listed below.

Component 102—hollow tubular logs,
Component 104—interior surfaces of the tubes,
Component 106—intersections of the tubes,
Component 108—exterior of the tubes,
Component 110—lithium,
Component 112—porous or non-porous conductor,
Component 114—solid electrolyte,
Component 116—housing,
Component 118—electrical load,
Component 120—electrically conducting lead, and
Component 122—electrically conducting lead.

Referring now to FIG. 1A, the inventor' solid-state lithium-air battery 100 is based on log-pile foam with hollow tubular logs 102. In this embodiment the solid electrolyte is in the form of a log-pile foam structure with deterministic pore sizes. Each of the logs 102 is a hollow tube such that the interior surfaces 104 of the tubes form the first volume. This first volume made up of the interconnected hollow tubes is referred to as a network of pores, as the first volume forms a dense highly redundantly connected network, and all the passages are formed of pores of relatively controlled characteristic diameter. The interior spaces of all of the tubes are connected at the intersections 106 of the tubular logs to form the first volume that does not overlap with the exterior 108 of the tubes (second volume). The second volume can be exposed to a flow of oxygen gas without exposing the first volume which is the inner surfaces of the electrolyte tubes. The benefit of using a log pile shape is that it creates the battery structure using the smallest possible feature size of the printer, a single voxel (i.e., volumetric pixel) that is translated to form a line. This is preferred over structures like gyroids which produce lower surface area per polymer volume, owing to the use of 2D surfaces instead of 1D lines as the basic element. The smaller the scale of the basic element of the battery, the higher the surface area to volume ratio. High surface area to volume ratio is desirable for an efficient use of the reacting metal as such a geometric configuration leads to high electrochemical reaction rates. It is important to note here that the hollow foam structure of the electrolyte encloses an interconnected network of pores wherein the interior volumes of the tubes connect with each other at the intersections of the tubes. Thus, such a network of pores cannot be generated by simply placing hollow tubes on top of each other. Instead, the desired network of pores may be generated by first conformally coating layers of the electrolyte material on top of a scaffold of log-piles and then by removing the material of the log-pile scaffold.

Figure 1B:
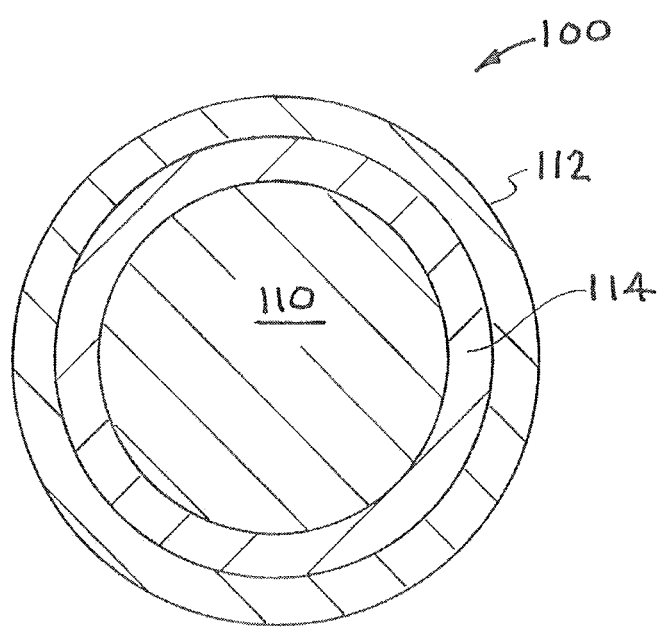
Figure 1C:
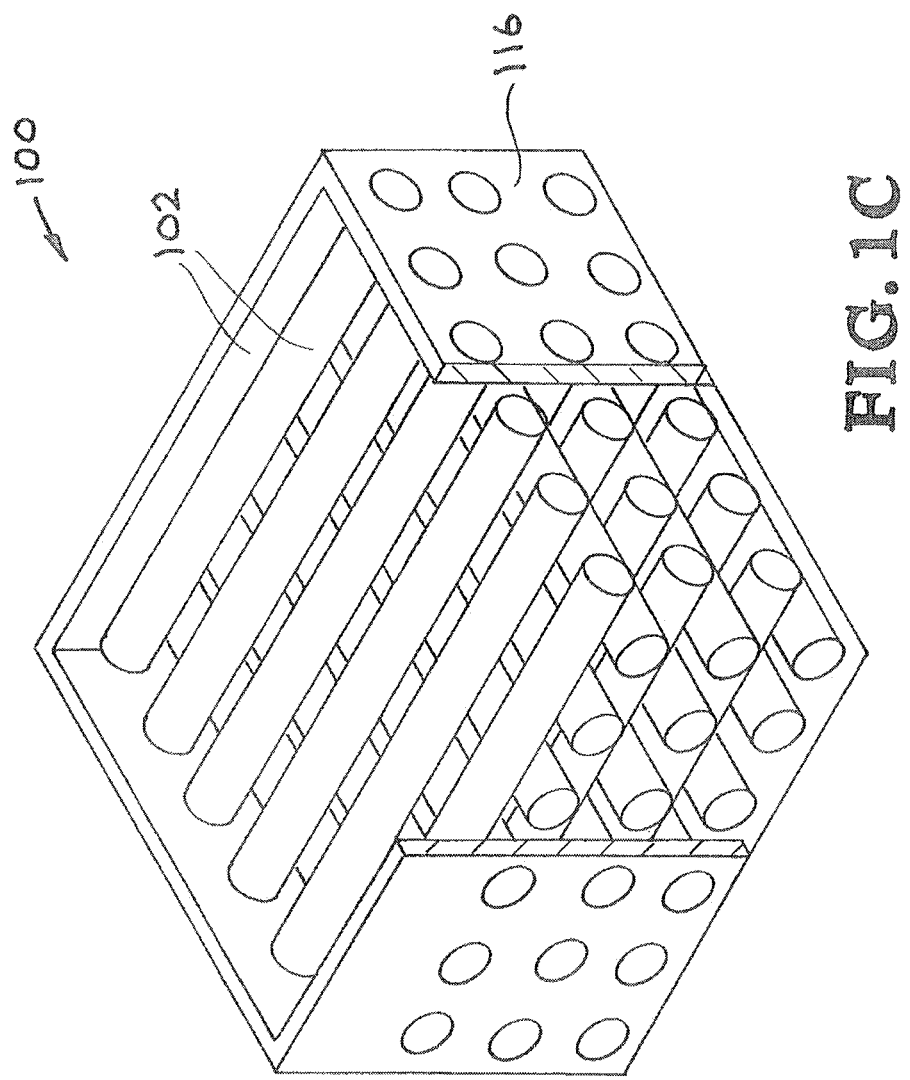

Referring now to FIGS. 1B and 1C, a fully functional lithium-air battery 100 is obtained from this electrolyte structure by depositing lithium 110 on the interior and a porous or non-porous conductor 112 (cathode) on the exterior surface of the tubes 102. A solid electrolyte 114 is between the lithium 110 and the porous or non-porous conductor 112. The non-porous conductor can be made porous by partially etching away the deposited layer. A porous conductor comprising porous carbon or carbon nanotubes may be deposited directly using techniques such as electrophoretic deposition (EPD). The components are contained in housing 116 that forms the boundary of the second volume.

Several modifications are possible for this embodiment. For example, the pore spacing in the foam structure may be deterministically varied with widely spaced pores lying on the exterior sections and closely spaced pores on the interior sections of the foam to allow for optimal flow of gaseous reactants into all sections of the foam structure. Similarly, the size of the pores may be deterministically varied with larger pores lying on the exterior of the foam structure whereas smaller pores lying at the interior of the foam for optimal deposition of the anode material into the pores, i.e., to ensure that lithium is deposited at all sections of the foam structure. For example, the pore spacing and pore size may be scaled by the shortest distance of the pores from any external edge of the battery. For selection of pore spacing, the edges of the battery refer to the edges at which the external ports to gaseous reactant (such as oxygen) are provided. For the selection of pore size, the edges of the battery refer to the edges at which the external ports for deposition of the anode material into the interior of the tubes are provided. Such a deterministic non-uniform structure would be similar to the structure of the capillary blood vessels in the human circulatory system.

In another modification, the anode structure may comprise a mixture of silicon and lithium metal. The silicon layer improves the wicking process by acting as a "lithiophilic" material similar to hydrophilic materials which aid in water transport across their surface via surface chemistry. This makes for easy flow of liquefied lithium into the first volume during wicking based deposition of liquefied lithium into the interconnected network of pores (first volume). The inventors' design with an enclosed first volume also allows one to eliminate non-reactive conductive material from the anode structure whose primary function is to provide structural support to the battery. Thus, lithium metal may itself act as the current collecting part of the anode electrode. In another modification of this embodiment, the porous cathode could be further coated with a thin layer of an oxygen permeable solid layer such as zirconia ($ZrO_2$). This layer would minimize physical disintegration of the cathode layer during charge-discharge cycling.

A solid-state lithium-air battery 100 comprises these elements: (i) electrically conductive anode structure, (ii) lithium metal that is electrically connected to the anode, (iii) solid-state electrolyte that is permeable to lithium ions but has a low electronic conductivity, (iv) electrically conductive cathode structure, and (v) access for air or oxygen gas flow. In addition, catalyst particles are often introduced into the cathode-electrolyte interface to facilitate the cathodic reactions. During the discharge step, lithium metal (Li) ionizes at the anode and passes its electrons into the external circuit. Lithium ions (Li+) travel through the electrolyte to reach the cathode. At the three-phase interface of the electrolyte-cathode-gas, oxygen gas reacts with Li+ ions and the electrons travelling through the external circuit to form solid lithium peroxide ($Li_2O_2$). This reaction is reversed when the electropotential is reversed, i.e., when the battery is charged.

Figure 1D:
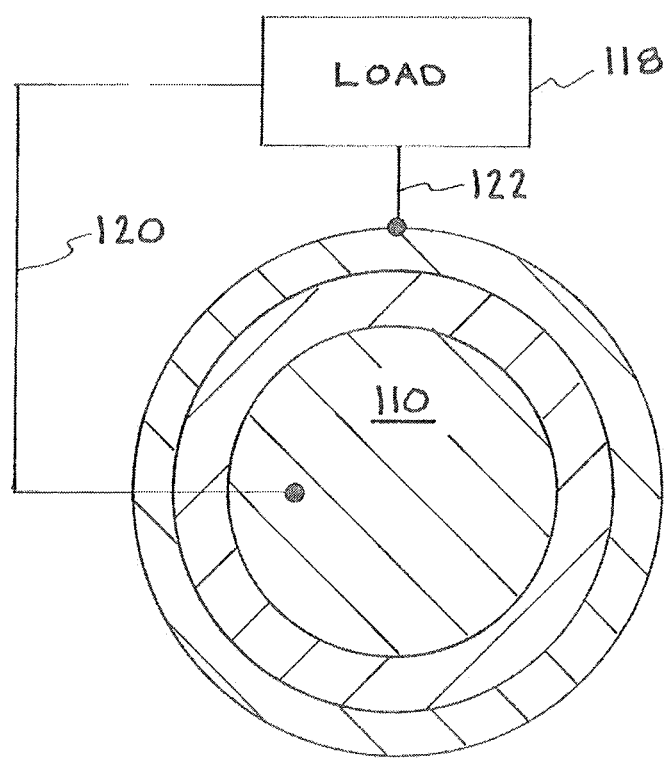

Referring now to FIG. 1D, the inventor' solid-state lithium-air battery 100 is illustrated with an electrical connection to a load 118. A lead 120 connects the lithium 110 anode to the load 118. A lead 122 connects the porous or non-porous conductor 112 cathode to the load 118.

Figure 2:
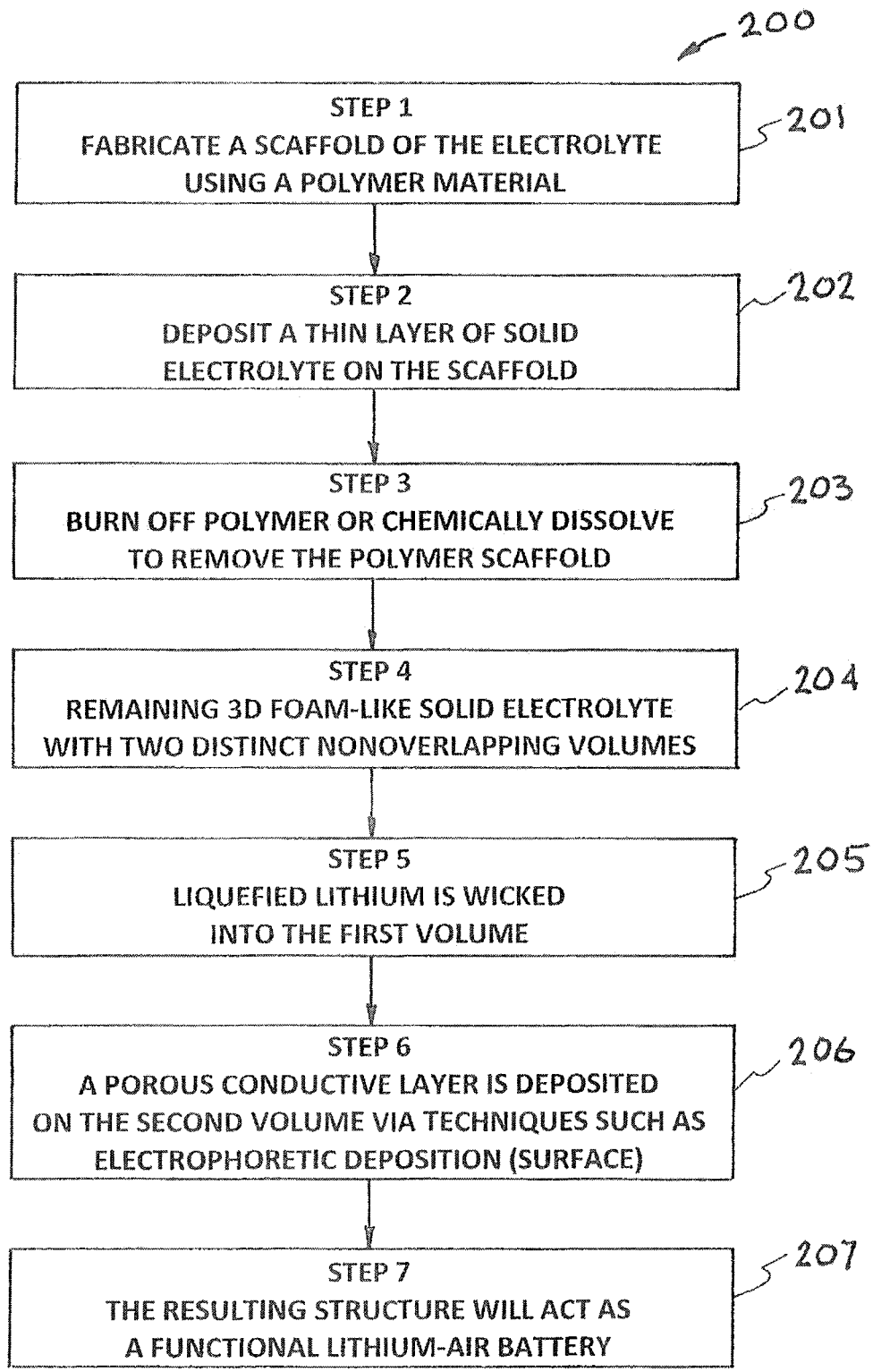
FIG. 2 is a flow chart illustrating an embodiment of the inventors' solid-state lithium-air battery.

Referring now to FIG. 2, an embodiment of the inventors' solid-state lithium-air battery is illustrated by a flow chart. This embodiment is designated generally by the reference numeral 200. The flow chart includes the steps listed below.

Step 201—fabricate a scaffold of the electrolyte using a polymer material,

Step 202—deposit a thin layer of solid electrolyte on the scaffold,

Step 203—burn off polymer or chemically dissolve to remove the polymer scaffold, Step 204—remaining 3D foam-like solid electrolyte with two distinct nonoverlapping volumes, Step 205—liquefied lithium is wicked into the first volume, Step 206—a porous conductive layer is deposited on the second volume via techniques such as electrophoretic deposition (surface), and Step 207—the resulting structure will act as functional lithium-air battery.

The embodiment 200 of the inventors' is a method for producing a solid-state lithium-air battery. Fabrication of the invented 3D foam batteries is enabled by two key fabrication capabilities: (i) the ability to print deterministic foams using submicron 3D printing techniques such as two-photon lithography and (ii) the ability to deposit thin conformal layers of materials via conformal deposition techniques such as atomic layer deposition (ALD). As the first step, a scaffold of the electrolyte is fabricated in polymer material. This may be done by printing or by other non-deterministic techniques. The printing of deterministic foams ensures the scaffold is of high quality. A thin layer of solid electrolyte is then deposited on the scaffold followed by burning off the polymer. This leaves behind a 3D foam-like solid electrolyte with two distinct non-overlapping volumes. Lithium (and optionally followed by a conductive layer) for anode is then deposited through one volume on the first surface whereas a conductive layer is deposited on the opposite surface through the second volume. Lithium may be deposited either through a gas phase deposition process or through a liquid phase wicking process. The optional conductive layer for the anode may be a material that is not electrochemically active, such as a metal or conductive silicon. It may also be skipped in favor of using the lithium metal itself as the conductive layer. The conductive layer on the second surface is made porous by a partial etch (timed-etch) or by selectively etching one component of the conductive layer such as used during the generation of nanoporous gold (NP-Au). The conductive layer on the second surface may also be deposited directly through electrophoretic deposition. The resulting structure acts as a functional lithium-air battery when the second volume is connected to a flow of oxygen gas and the two surfaces of the electrode are connected to an external electrical circuit. To improve the charging overpotential performance of the battery, catalyst nanoparticles may also be deposited onto the second surface. In addition, the ionic conductivity of the electrolyte can be improved by doping the electrolyte with suitable materials or controlling the operational temperature as ionic conductivity rises significantly with temperature. The microfabrication field provides a number of techniques to fabricate doped solid materials. It is important to note that it is possible to deposit the two electrodes on two different sides of the electrolyte layer by closing off the other volume during deposition on a particular surface. Whether there are only 2 volumes, or multiple sets of 2 volumes, the process remains the same and all equivalent first volumes in each set would be acted on equally. The same would hold for the second volume in each set.

The 3D battery disclosed here may also be miniaturized into a 2D battery by using a single layer of the polymer structure as the scaffold for the network of pores in the solid electrolyte. The polymer structure could be placed on an electrically conductive surface such as a silicon wafer. The electrolyte deposition process (step 202) is simplified for a one-layer battery because readily-available directional deposition techniques, such as physical vapor deposition (sputtering), may be used. External connections to the first volume of interconnected pores may be made via through-holes in the silicon wafer. These pores and holes would provide a means of egress for the burnt/dissolved polymer to be removed. Likewise, the same pores and holes could be used to infill the liquefied lithium. The end result is a planar miniaturized battery with a single layer of the 3D battery. The planar scaffold structure would generally be an array of log pile 'wires' laid out in a 2D structure, with the ends linked together. The cathode could be deposited onto the top of the electrolyte, providing a nearly planar structure that is easy to fabricate and retains the high electrochemical reaction rates of the more complex 3D design, but without the high energy storage.

Referring now to FIGS. 3A-3H another embodiment of the inventors' method is illustrated by a flow chart. This embodiment is designated generally by the reference numeral 300. The flow chart includes the steps listed below.

Step 301—3D print a scaffold of the electrolyte using a polymer material,

Step 302—deposit a thin layer of solid electrolyte on the scaffold,

Step 303—burn off polymer or chemically dissolve to remove the polymer scaffold, Step 304—remaining 3D foam-like solid electrolyte with two distinct nonoverlapping volumes, Step 305—liquefied lithium is wicked into the first volume, Step 306—a porous conductive layer is deposited on the second volume via techniques such as electrophoretic deposition (surface), Step 307—the resulting structure will act as a functional lithium-air battery.

Figure 3A:
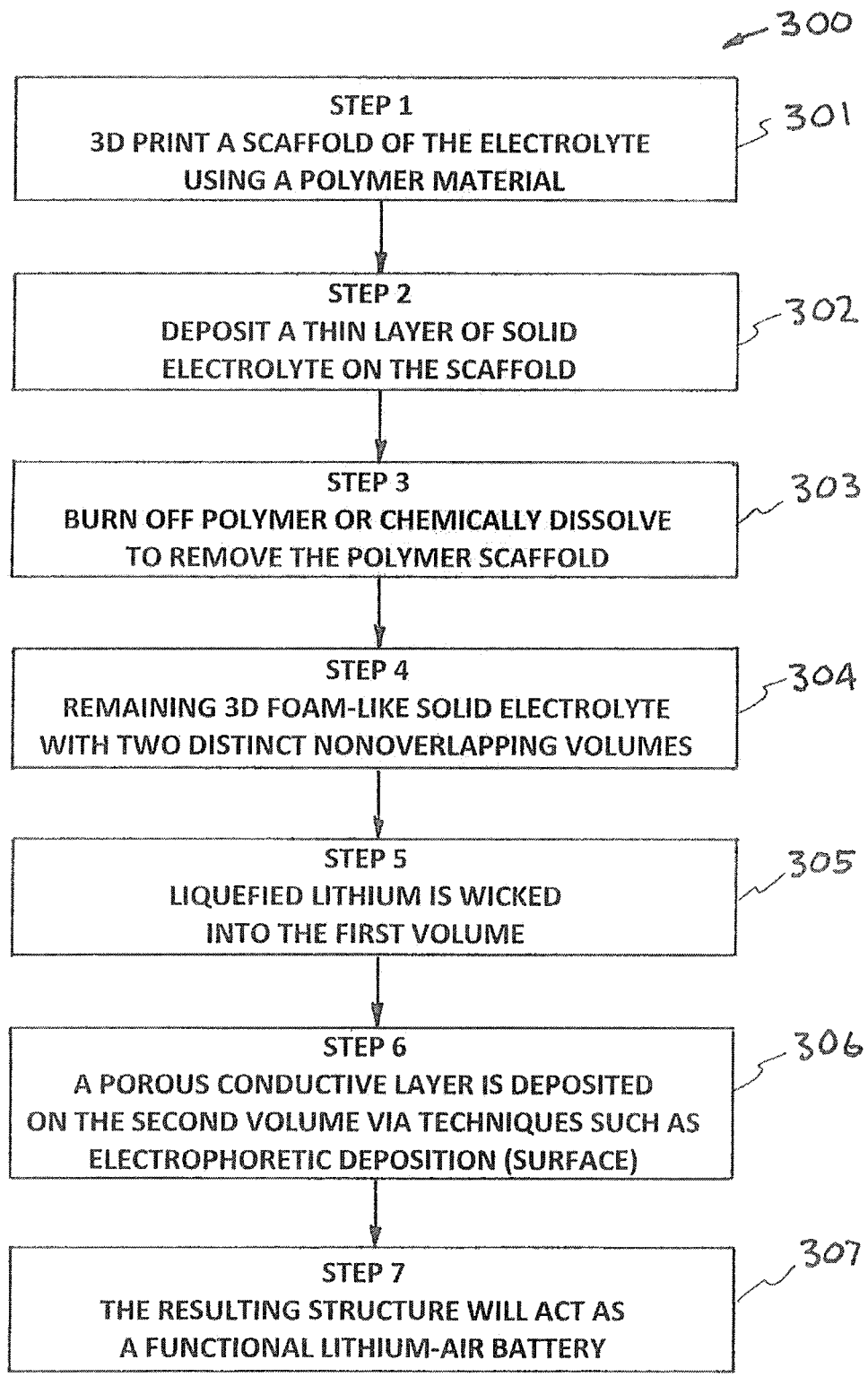
FIGS. 3A-3H illustrate another embodiment of the inventors' solid-state lithium-air battery.
Figure 3B:
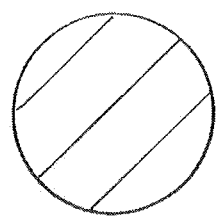
Figure 3C:
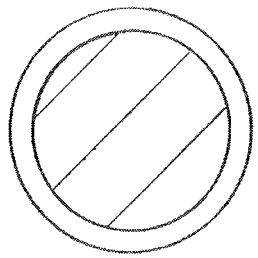
Figure 3D:
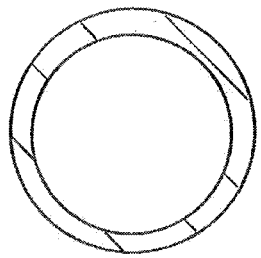
Figure 3E:
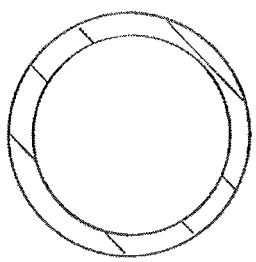
Figure 3F:
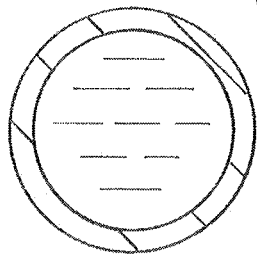
Figure 3G:
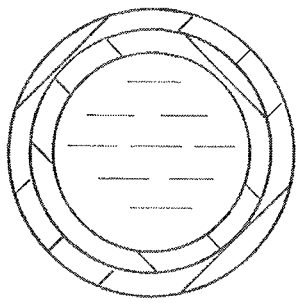
Figure 3H:
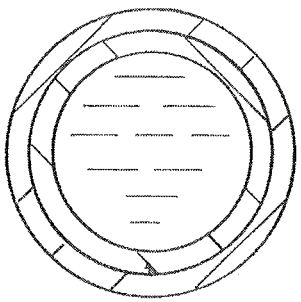

The schematics of FIGS. 3B, 3C, 3D, 3E, 3F, 3G, and 3H illustrate components related to the steps in the flow chart of FIG. 3A. In FIG. 3B a scaffold of the electrolyte is 3D printed using a polymer material. In FIG. 3C a thin layer of solid electrolyte is deposited on the scaffold. In FIG. 3D the polymer scaffold is removed by burning off the polymer or chemically dissolving the polymer. FIG. 3E shows the remaining 3D foam-like solid electrolyte with two distinct nonoverlapping volumes. In FIG. 3F liquefied lithium is wicked into the first volume. In FIG. 3G a porous conductive layer is deposited on the second volume via techniques such as electrophoretic deposition (surface). FIG. 3H shows the resulting structure that will act as a functional lithium-air battery.

Materials

The desirable properties and suggested selections for the materials are listed in Table 1 below.

TABLE 1

Selection of materials for 3-D solid-state lithium-air batteries

| Material type | Desirable properties | Suggested choices |
|---|---|---|
| Anode electrode layer | Electron conductor, chemically stable, non-oxidizing, non-reacting with lithium | Gold, silver, copper |
| Reacting metal | High energy density | Lithium, sodium |
| Electrolyte | High ionic conductivity, low electronic conductivity, low oxidizer permeability, chemically stable | Silica, doped silica, alumina, doped alumina |
| Cathode electrode layer | Electrically conductive, thermally stable, can be etched | Nanoporous carbon, carbon nanotube (CNT), nanoporous gold |

TABLE 1-continued

Selection of materials for 3-D solid-state lithium-air batteries

| Material type | Desirable properties | Suggested choices |
|---|---|---|
| Reacting oxidizer | High purity gas | Oxygen |
| Catalyst | High activity, easy to deposit via EPD | Ruthenium |

Geometrical Parameters

The selection criteria and suggested selections for the geometric parameters are listed in Table 2 below.

TABLE 2

Selection of geometric parameters for 3-D solid-state lithium-air batteries

| Geometric parameter | Selection criteria | Suggested values |
|---|---|---|
| Thickness of solid electrolyte layer | (1) Must be as thin as possible but thicker than dielectric breakdown thickness that corresponds to the electrolyte material and the maximum service voltage of the battery (2) Should be sufficiently thick to minimize porosity due to deposition technique | 5 nm to 500 nm |
| Spacing of pores | (1) May be as small as possible but larger than the porosity of the conductive cathode layer (2) Spacing may vary for optimal gas flow | 10 nm to 10 μm |
| Size of pores | (1) May be as small as possible to maximize surface area to volume ratio but must be larger than the porosity of the conductive cathode layer (2) Size may vary for optimal lithium deposition | Smaller than 10 μm |

The inventors' invention overcomes the combined challenges of low power density and low cycle life in lithium-air batteries by using solid-state electrolytes to achieve stability (for high cycle life) and three-dimensional micro and nano scale structuring of the electrolyte to achieve low interfacial resistance (for high power density).

The inventors' battery design surpasses the performance of existing solid-state electrolytes and porous cathodes by combining the positive aspects of the two existing approaches (porous cathode vs solid-state electrolyte) while eliminating their individual drawbacks. Specifically, the inventors' design comprises deterministic porous foam-like structures with a thin layer of solid-state electrolyte.

Figure 4:
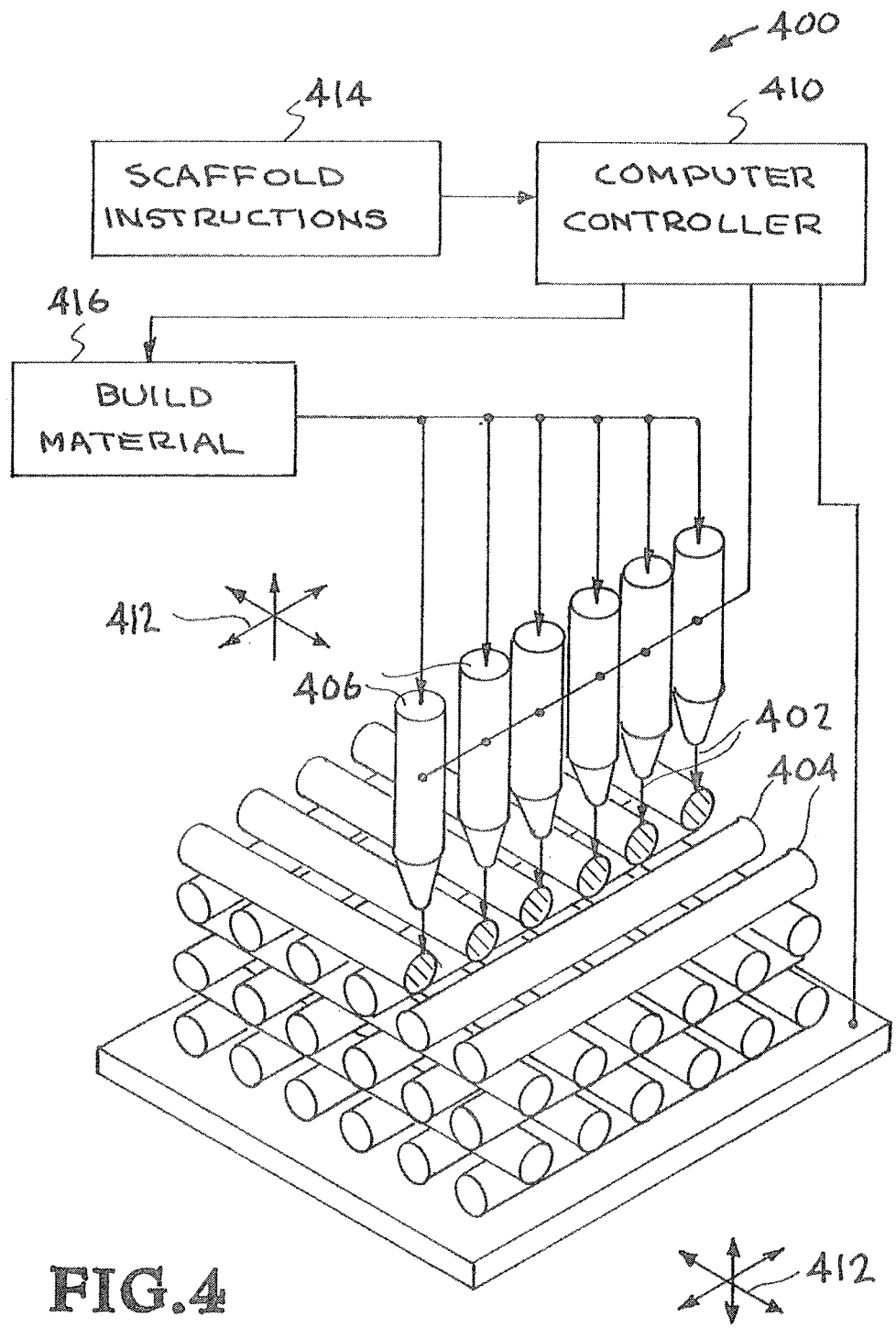
FIG. 4 illustrates the fabrication of the scaffold of the electrolyte using a polymer material by 3D printing.

Referring now to FIG. 4, fabrication of the scaffold of the electrolyte using a polymer material by 3D printing is illustrated. The 3D printing system is designated generally by the reference numeral 400. As illustrated in FIG. 4, extruded material 402 is deposited on scaffold 404 to be printed by the print heads 406. The scaffold 404 is carried by a moveable substrate 418. The print heads 406 have nozzles 408 for extruding the material 402 onto the scaffold 404 being printed. Movement of the print heads 406 is controlled by computer controller 410 which provides freedom of movement along all axes as indicated by the arrows 412. The scaffold to be created by the system 400 is contained in the scaffold instructions 414 which are fed to the computer controller 410 with the widely used numerical control programming language G-Code. The computer controller 410 uses the instructions to move the print heads 406 through a series of moments forming the scaffold 418. Build material 416 is supplied to the print heads 406.

The scaffold of the electrolyte may also be printed using a polymer material by two-photon lithography. In this technique, a focused laser spot is scanned in three-dimensional space within the interior of a photopolymer material. Regions of the photopolymer exposed to the focused spot undergo a chemical curing reaction wherein the exposed regions become insoluble in a solvent. Due to the nonlinear two-photon absorption process, submicron volumetric spots can be generated through this technique. Upon generation of the 3D scaffold, the uncured photopolymer material can be removed by dissolving it in a suitable solvent. The remaining 3D polymer scaffold can then be coated with a thin layer of the solid electrolyte material to generate the electrolyte scaffold. Due to its submicron resolution, batteries with very small submicron pores can be deterministically fabricated using two-photon lithography.

The 3D battery disclosed here may also be miniaturized into a 2D battery by using a single layer of the polymer structure as the scaffold for the network of pores in the solid electrolyte. The miniaturized 2D battery is designated generally by the reference numeral 500. The miniaturized 2D battery 500 is constructed according to the systems and methods previously described.

The polymer structure could be placed on an electrically conductive surface such as a silicon wafer. The electrolyte deposition process is simplified for a one-layer battery because readily-available directional deposition techniques, such as physical vapor deposition (sputtering), may be used. External connections to the first volume of interconnected pores may be made via through-holes in the silicon wafer. These pores and holes would provide a means of egress for the burnt/dissolved polymer to be removed. Likewise, the same pores and holes could be used to infill the liquefied lithium. The end result is a planar miniaturized battery 500 with a single layer of the 3D battery. The planar scaffold structure would generally be an array of log pile 'wires' laid out in a 2D structure, with the ends linked together. The cathode could be deposited onto the top of the electrolyte, providing a nearly planar structure that is easy to fabricate and retains the high electrochemical reaction rates of the more complex 3D design, but without the high energy storage. The anode lead and cathode lead provide connections for the miniaturized 2D battery 500.

One embodiment of the miniaturized 2D battery 500 and the systems and methods for constructing the miniaturized 2D battery 500 are illustrated in FIGS. 5A-5G.

FIG. 5A is an isometric view of the planar substrate 502 used in the miniaturized 2D battery 500. The planar substrate 502 includes holes 504. Only a small quantity of holes 504 are shown in the planar substrate 502 for illustration purposes; however, it is to be understood that many more holes 504 could be included in the substrate 502.

FIG. 5B is a cross sectional view of the planar substrate 502 of FIG. 5A. FIG. 5B shows that the holes 504 pass entirely through the planar substrate 502.

Referring now to FIG. 5C, the polymer scaffold 506 is shown deposited on the substrate 502.

Figure 5D:
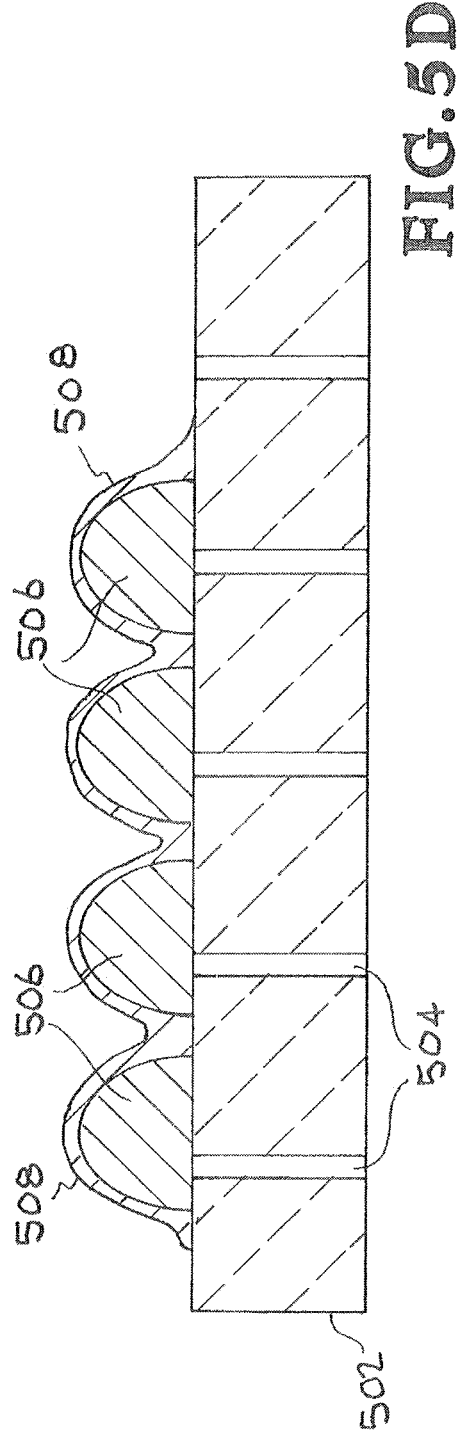

Referring now to FIG. 5D, a thin layer of silicone 508 is deposited on the polymer scaffold 506.

Figure 5E:
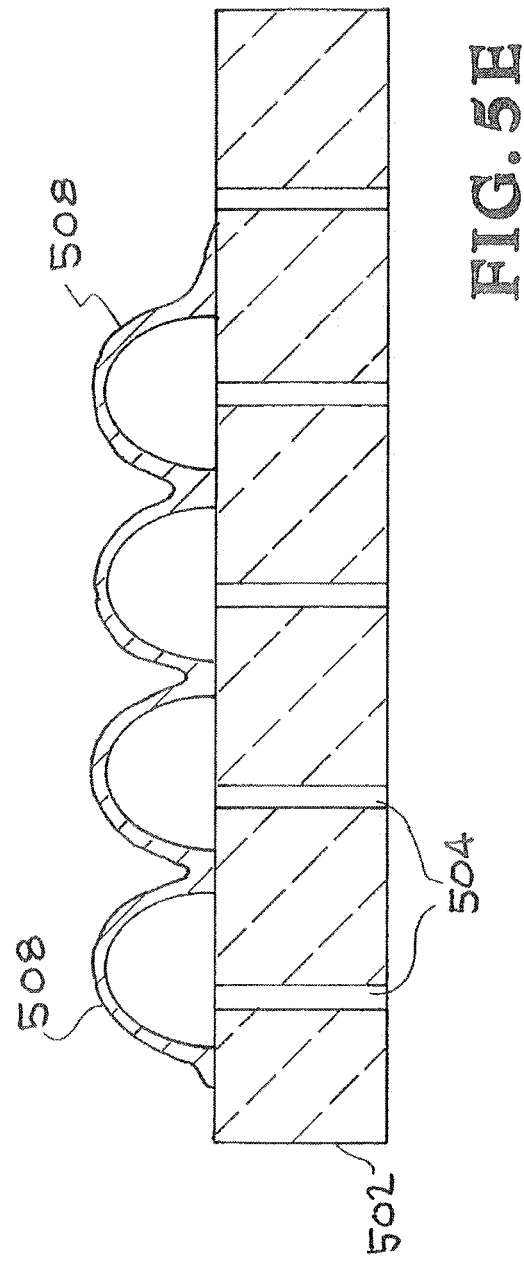

Referring now to FIG. 5E, the polymer scaffold 506 has been removed. Removal of the polymer scaffold 506 can be accomplished by removing it through the holes 504 in the substrate 502.

Referring now to FIG. 5F, the areas formerly occupied by the polymer scaffold 506 are filled with lithium 510. Filled the areas with lithium 510 can be accomplished by filled the lithium 510 through the holes 504 in the substrate 502.

Referring now to FIG. 5G, a porous cathode layer 512 is deposited on top of the silicone layer 508. A cathode lead 514 and an anode lead 516 are attached to provide the miniaturized 2D battery 500.

Another embodiment of the systems and methods for constructing the battery are illustrated in FIG. 6. The battery is designated generally by the reference numeral 600. As illustrated in FIG. 6 the scaffold of the electrolyte is be printed using a polymer material by two-photon lithography. The two-photon lithography process is shown in FIG. 6. In this technique, a focused laser spot 604 is scanned in three-dimensional space within the interior of a photopolymer material 610 that is supported on a substrate 602. Regions of the photopolymer exposed to the focused spot undergo a chemical curing reaction wherein the exposed cured resist regions 608 become insoluble in a solvent. Due to the nonlinear two-photon absorption process, submicron volumetric spots (voxels 606) can be generated through this technique. These voxels are smaller than the diffraction-limited focused light spot and may be as small as 100 nm wide. Upon generation of the 3D scaffold, the uncured photopolymer material 610 can be removed by dissolving it in a suitable solvent. The remaining 3D polymer scaffold can then be coated with a thin layer of the solid electrolyte material to generate the electrolyte scaffold. Due to its submicron resolution, batteries with very small submicron pores can be deterministically fabricated using two-photon lithography.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

All elements, parts and steps described herein are preferably included. It is to be understood that any of these elements, parts and steps may be replaced by other elements, parts and steps or deleted altogether as will be obvious to those skilled in the art.

Broadly, this writing discloses at least the following: A scaffold of an electrolyte is fabricated in polymer material using 3D printing techniques. A thin layer of solid electrolyte is deposited on the scaffold followed by burning off the polymer. This leaves behind a 3D foam-like solid electrolyte with two distinct non-overlapping volumes. Lithium followed by a conductive layer (for anode) is then deposited through one volume on the first surface whereas a porous or non-porous conductive layer is deposited on the opposite surface through the second volume. The non-porous conductive layer on the second surface is made porous by a selective timed etch.

Concepts

This writing also presents at least the following concepts:

Concept 1. A three-dimensional battery comprising:

a non-planar thin solid electrolyte layer that separates two non-overlapping volumes, wherein a first non-overlapping volume is in the form of a network of pores, and wherein the diameter of pores in this first non-overlapping volume is smaller than 5 micrometers;

a layer of electrically conductive anode material located in the first non-overlapping volume and in contact with the solid electrolyte, wherein at least one part of the anode material is capable of undergoing electrochemical oxidation;

a porous electrically conductive thin cathode film located in the second non-overlapping volume and conformally covering the solid electrolyte; and a passage in the second non-overlapping volume for flowing an oxidizing gas, wherein the oxidizing gas contacts the porous cathode film.

Concept 2. The battery of Concept 1, wherein the thickness of the solid electrolyte layer lies between 5 nm and 500 nm.

Concept 3. The battery of Concepts 1 and 2, wherein the electrolyte is ceramic

Concept 4. The battery of Concepts 1, 2, and 3 wherein the diameter of pores in this first non-overlapping volume is smaller than 1 micrometer Concept 5. The battery of Concepts 1, 2, 3, and 4 wherein the thickness of the solid electrolyte layer is uniform.

Concept 6. The battery of Concepts 1, 2, 3, 4, and 5 wherein the spacing between pores in the first non-overlapping volume lies between 10 nanometers and 10 micrometers.

Concept 7. The battery of Concepts 1, 2, 3, 4, 5, and 6 wherein the spacing of the pores in the first non-overlapping volume is non-uniform and is scaled by the shortest distance of the pores from any external edge of the battery.

Concept 8. The battery of Concepts 1, 2, 3, 4, 5, 6, and 7 wherein the anode material substantially fills the first non-overlapping volume Concept 9. The battery of Concepts 1, 2, 3, 4, 5, 6, 7, and 8 wherein the porous cathode film is in the form of a mixture of multiple materials such as i) catalyst material, ii) carbon nanoparticles, and iii) carbon nanotubes.

Concept 10. The battery of Concepts 1, 2, 3, 4, 5, 6, 7, 8, and 9 wherein the anode material is lithium metal.

Concept 11. The battery of Concepts 1, 2, 3, 4, 5, 6, 7, 8, 9, and 10 wherein the anode material is a mixture of various metals.

Concept 12. The battery of Concepts 1, 2, 3, 4, 5, 6, 7, 8, 9, 10, and 11 wherein the anode material is a mixture of various metals and silicon.

Concept 13. The battery of Concepts 1, 2, 3, 4, 5, 6, 7, 8, 9, 10, 11, and 12 wherein the solid electrolyte is an oxide of aluminum or silicon.

Concept 14. The battery of Concepts 1, 2, 3, 4, 5, 6, 7, 8, 9, 10, 11, 12, and 13 wherein the oxidizing gas is pure oxygen.

Concept 15. A method of fabricating a three-dimensional battery comprising the steps of:
providing a foam structure which is the geometric inverse of a network of pores, wherein the diameter of inverse pores is smaller than 5 micrometers;
encasing the foam structure with a non-planar thin solid electrolyte layer;
removing the material of the foam structure, wherein removing the material leaves the electrolyte layer intact as a shell around a network of pores;
filling the network of pores in the interior of the electrolyte shell with an electrically conductive anode material, wherein at least one part of the anode material is capable of undergoing electrochemical oxidation;
encasing the exterior of the electrolyte shell with a porous electrically conductive thin cathode film which is in contact with the electrolyte shell, wherein the resulting cathode structure is gas permeable; and
attaching separate electrodes to the anode material and to the cathode material.

Concept 16. The method of Concept 15, wherein the network of pores is substantially filled with the anode material.

Concept 17. The method of Concepts 15 and 16 wherein the foam structure is fabricated by two-photon lithography.

Concept 18. The method of Concepts 15, 16, and 17 wherein the electrolyte layer is formed by atomic-layer deposition over the foam structure.

Concept 19. The method of Concepts 15, 16, 17, and 18 wherein the material of the foam structure is removed by thermal burnout.

Concept 20. The method of Concepts 15, 16, 17, 18, and 19 wherein the material of the foam structure is removed by chemical etching.

Concept 21. The method of Concepts 15, 16, 17, 18, 19, and 20 wherein the anode material is transported into the network of pores via a liquid wicking operation.

Concept 22. The method of Concepts 15, 16, 17, 18, 19, 20, and 21 wherein the anode material is transported into the network of pores via a gaseous deposition operation.

Concept 23. The method of Concepts 15, 16, 17, 18, 19, 20, 21, and 22 wherein the cathode film is formed by electrophoretic deposition of a mixture of nanoparticle.

Concept 24. A method of making a micro-battery, comprising the steps of:
3D print a scaffold of the electrolyte using a polymer material,
deposit a thin layer of solid electrolyte on the scaffold,
burn off the polymer,
provide remaining 3D foam-like solid electrolyte with two distinct non-overlapping volumes,
provide first a lithium layer followed by a conductive layer (anode) is deposited on the first volume (surface),
provide second a conductive layer deposited on the second volume (surface), and
etch second volume (surface to make it porous).

The invention claimed is:

1. A three-dimensional battery comprising:
a non-planar thin solid electrolyte layer that separates two non-overlapping volumes, wherein a first non-overlapping volume is in the form of a network of pores, and wherein the diameter of pores in the first non-overlapping volume is smaller than 5 micrometers;
a layer of electrically conductive anode material located in the first non-overlapping volume and in contact with the solid electrolyte layer, wherein at least one part of the anode material is capable of undergoing electrochemical oxidation;
a porous electrically conductive thin cathode film located in a second non-overlapping volume and conformally covering the solid electrolyte layer; and
a passage in the second non-overlapping volume for flowing an oxidizing gas, wherein the oxidizing gas contacts the porous cathode film.

2. The battery of claim 1, wherein the thickness of the solid electrolyte layer lies between 5 nm and 500 nm.

3. The battery of claim 1, wherein the solid electrolyte layer is ceramic.

4. The battery of claim 1, wherein the diameter of pores in the first non-overlapping volume is smaller than 1 micrometer.

5. The battery of claim 1, wherein the thickness of the solid electrolyte layer is uniform.

6. The battery of claim 1, wherein a spacing between pores in the first non-overlapping volume lies between 10 nanometers and 10 micrometers.

7. The battery of claim 1, wherein a spacing of the pores in the first non-overlapping volume is non-uniform and is scaled by the shortest distance of the pores from any external edge of the battery.

8. The battery of claim 1, wherein the anode material substantially fills the first non-overlapping volume.

9. The battery of claim 1, wherein the porous cathode film is in the form of a mixture of multiple materials such as i) catalyst material, ii) carbon nanoparticles, and iii) carbon nanotubes.

10. The battery of claim 1, wherein the anode material is lithium metal.

11. The battery of claim 1, wherein the anode material is a mixture of various metals.

12. The battery of claim 1, wherein the anode material is a mixture of various metals and silicon.

13. The battery of claim 1, wherein the solid electrolyte layer is an oxide of aluminum or silicon.

14. The battery of claim 1, wherein the oxidizing gas is pure oxygen.

15. A method of fabricating a three-dimensional battery comprising the steps of:
- providing a foam structure which is the geometric inverse of a network of pores, wherein the diameter of inverse pores is smaller than 5 micrometers;
- encasing the foam structure with a non-planar thin solid electrolyte layer;
- removing the material of the foam structure, wherein removing the material leaves the electrolyte layer intact as a shell around a network of pores;
- filling the network of pores in the interior of the electrolyte shell with an electrically conductive anode material, wherein at least one part of the anode material is capable of undergoing electrochemical oxidation;
- encasing the exterior of the electrolyte shell with a porous electrically conductive thin cathode film which is in contact with the electrolyte shell, wherein the resulting cathode structure is gas permeable; and
- attaching separate electrodes to the anode material and to a cathode material.

16. The method of claim 15, wherein the network of pores is substantially filled with the anode material.

17. The method of claim 15, wherein the foam structure is fabricated by two-photon lithography.

18. The method of claim 15, wherein the solid electrolyte layer is formed by atomic-layer deposition over the foam structure.

19. The method of claim 15, wherein the material of the foam structure is removed by thermal burnout.

20. The method of claim 15, wherein the material of the foam structure is removed by chemical etching.

21. The method of claim 15, wherein the anode material is transported into the network of pores via a liquid wicking operation.

22. The method of claim 15, wherein the anode material is transported into the network of pores via a gaseous deposition operation.

23. The method of claim 15, wherein the cathode film is formed by electrophoretic deposition of a mixture of nanoparticle.

24. A method of making a micro-battery, comprising the steps of:
- 3D print a scaffold of an electrolyte using a polymer material,
- deposit a thin layer of solid electrolyte on the scaffold,
- burn off the polymer material,
- provide remaining 3D foam-like solid electrolyte with two distinct non-overlapping volumes,
- provide first a lithium layer followed by depositing a conductive layer (anode) is deposited on a first volume (surface),
- provide second a conductive layer deposited on a second volume (surface), and etch the second volume (surface to make it porous).

* * * * *